Figure 1:
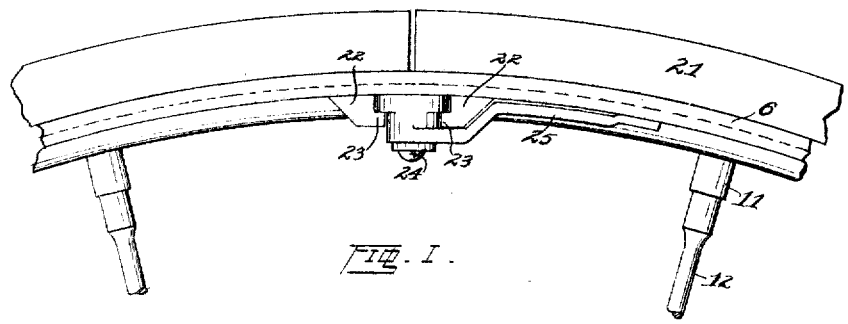

R. S. BRYANT.
RIM FOR VEHICLE WHEELS.
APPLICATION FILED NOV. 20, 1912.

1,201,551. Patented Oct. 17, 1916.

Inventor.
Richard S. Bryant
Hull & Smith
By his Attys.

Witnesses:

UNITED STATES PATENT OFFICE.

RICHARD S. BRYANT, OF CLEVELAND, OHIO, ASSIGNOR TO THE STANDARD WELDING COMPANY, OF CLEVELAND, OHIO, A CORPORATION OF OHIO.

RIM FOR VEHICLE-WHEELS.

1,201,551.  Specification of Letters Patent.  Patented Oct. 17, 1916.

Application filed November 20, 1912. Serial No. 732,501.

*To all whom it may concern:*

Be it known that I, RICHARD S. BRYANT, a citizen of the United States, residing at Cleveland, in the county of Cuyahoga and State of Ohio, have invented a certain new and useful Improvement in Rims for Vehicle-Wheels, of which the following is a full, clear, and exact description, reference being had to the accompanying drawings.

This invention relates to vehicle wheels and particularly to wheels having wire spokes. In wheels of this type, as is well known, the practice is to secure the inner ends of the spokes to a suitable hub in any convenient, tension resisting manner, and to thread the outer ends of the spokes to nipples rotatably secured in the rim. The spokes are all held under tension, wherefore the rim is obliged to support not only the tension of all of the spokes, but also the weight of the vehicle, from the fact that with a wire spoke wheel, the hub is at all times suspended from the upper part of the rim through the agency of the spokes above the hub, rather than being propped up from the lower part of the rim through the agency of the spokes beneath the hub, as is the case in wooden wheels. Accordingly the nipples are made hollow and the ends of the spokes are allowed to protrude therethrough during the assembling of the wheel and are finally cut or broken off beyond the ends of the nipples before locating the tire on the rim. The ends of the spokes must therefore be covered with some sort of a shielding plate prior to locating the tire on the rim so as to prevent the abrasion or tearing of the latter by the jagged ends of the spokes.

The objects of this invention are the provision of a rim for wire spoke wheels which can be readily rolled from standard flat sheet steel and that shall have great strength and thickness combined with light weight; the provision with a device of this character of a liner or shield of simple and easy manufacture; the provision of a combination of liner and rim which shall serve to strengthen each other in a material degree, thereby permitting each to be made of lighter metal than has heretofore been possible; the provision of a rim of less total thickness than wire spoke rims hitherto devised; while further objects and advantages of the invention will become apparent as the description proceeds.

Figures 2, 3:
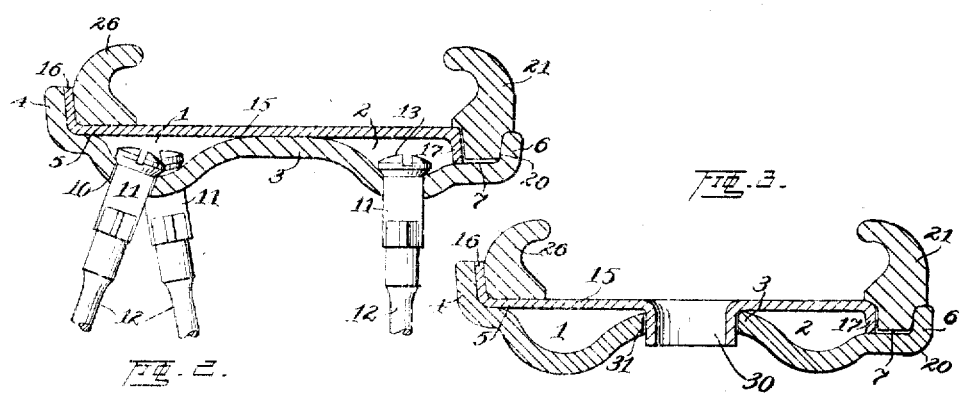
Figure 4:
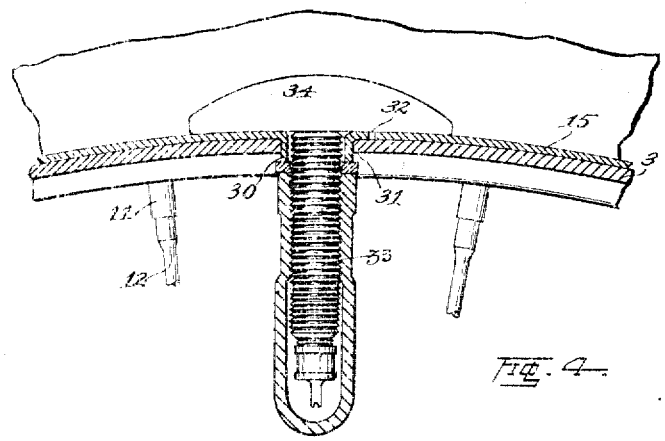
Figure 5:
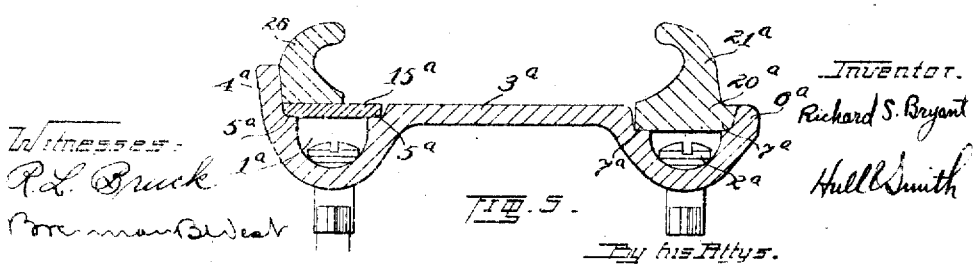

Generally speaking, my invention may be defined as consisting of the combinations and construction recited in the claims hereto annexed and illustrated in the drawings accompanying and forming a part of this application, wherein:

Figure 1 is a side elevational view of a portion of a wheel having a rim constructed in accordance with my invention; Fig. 2 is a transverse cross-sectional view of said rim, showing part of the spokes and nipples; Fig. 3 is a transverse cross-sectional view of the rim taken through the valve stem aperture; Fig. 4 is a longitudinal cross-sectional view through the rim showing a portion of the tire in place thereon, and the valve stem located in its aperture; and Fig. 5 is a transverse cross-sectional view of a modified form of rim.

In constructing a rim according to this invention, I take a strip of sheet steel of the proper gage and of a slightly greater width than the completed rim and then circle the same and weld its ends together so as to form a complete ring. At a slight distance inside of each lateral edge of said ring, I then roll a groove or gutter, each of said grooves or gutters being concave outwardly and form by embossing or corrugating inwardly the metal of the rim. These grooves or gutters are indicated at 1 and 2 respectively in Figs. 2 and 3, and are separated by a centrally-disposed, flat-topped ridge 3. Supposing that the groove 1 is to lie at the inside of the rim, the portion of the metal between this groove and the adjacent edge of the ring is now turned outwardly as at 4 to form a flange, this flange being separated from the adjacent edge of the groove 1 by a ledge or shelf 5, preferably substantially level with the top of the ridge 3. The metal at the opposite side of the rim is also turned outwardly as at 6 so as to form an outturned flange and between this second flange and the groove or gutter 2 is formed a second ledge or shelf 7 of less height than the shelf 5 and intermediate in height between the bottom of the groove or gutter 2 and the top of the ridge 3. The edge of the flange 6 may project slightly beyond the top of the ridge 3 but not to so great a height as the flange 4, for a reason to be hereinafter described. The bottoms of the grooves or gutters 1 and 2 are preferably wide and rounding as shown in Fig. 3 and are formed with spaced apertures 10 receiving hollow, interiorly-threaded, nipples 11 into which are inserted the outer ends of wire spokes 12. The ends of these nipples farthest from the hub are enlarged as shown at 13 so as to overlie the edges of the apertures 10 in tension-resisting engagement.

To cover the grooves or gutters and form a seat for the tire, I provide a split ring 15 of thin sheet metal, said ring having at one side the outwardly turned lip 16 adapted to engage the inner face of the flange 4, and having at the opposite edge the inwardly turned lip 17 adapted to rest upon the shelf 7 between the flange 6 and the edge of the adjacent groove or gutter. The bottom of this ring will therefore be supported at three points transversely of the rim, the shelf 5, the top of the ridge 3, and the shelf 7. The lip 17 is preferably slanted slightly outwardly as shown in Figs. 2 and 3 so as to form in connection with the flange 6 and shelf 7 an annular groove for the reception of the base portion 20 of a detachable flange 21, which flange can be secured in place by any suitable means, such for instance as that described and claimed in my copending application filed April 25, 1912, Serial No. 693,078. Briefly described, this securing expedient consists in forming the flange 21 as a split ring, having adjacent to each of its ends an inwardly projecting lug 22 each of which is formed on its forward face with a projecting toe 23. The bottom of the flange-receiving groove is formed with an aperture or apertures for the reception of these lugs and a suitable securing member such as a latch 24 is inserted between these toes and the inner surface of the annular member so as to prevent the withdrawal of the lugs from their apertures. In the present embodiment this securing member is shown as pivoted to the annular member, and as provided with an extended resilient handle 25 by means of which it is manipulated and retained in place. A floating ring 26 surrounds the opposite side of the split ring 15, and rests against the lip 16 to form a support for the opposite side of the tire. The ring 26 also binds the split ring 15 firmly about the rim.

For the reception of the valve stem I preferably form the plate 15 adjacent to one of its ends with a hollow, inwardly-projecting, radial nipple 30 as shown in Figs. 3 and 4, and form the ridge portion 3 of the rim with an aperture 31 for the reception of this nipple. The abutting ends of the ring 13 are indicated at 32 in Fig. 3. When the valve stem 33 is inserted in the nipple 30 it will be seen that the metal plate 34 with which the valve stem is usually associated will overlap the joint 32 so as to prevent the inner tube from becoming blown into the same and pinched or otherwise injured thereby. It is obvious, however, that this joint could fall anywhere within the circumference of the wheel without departing from my invention.

In Fig. 5 I have illustrated a modified form of rim which may in some cases be employed with good results. In this embodiment the annular member is indicated at 3ª and is formed adjacent to each edge with annular grooves or gutters 1ª and 2ª respectively. The groove 1ª being at the rearward or inside edge of the rim, the metal outside of said groove is bent outwardly to form a flange 4ª. The grooves 2ª being at the forward or outer side of the wheel the outer wall of the groove 2ª is terminated substantially flush with the top of the member 3ª as indicated at 6ª. The metal at each side of the mouth of the groove 1ª is recessed to form seats 5ª—5ª in which is located a split ring 15ª, the outer surface whereof is preferably substantially flush with the outer surface of the member 3ª. The metal adjacent to the edges of the groove or gutter 2ª is also recessed as at 7ª—7ª to form a seat for the enlarged base 20ª of the detachable flange 21ª which may be secured in place in any suitable manner such as that above mentioned or by other expedients well known in the art. A floating ring 26 may be positioned upon the ring 15ª and against the flange 4ª as in the preceding modification. The grooves or gutters 1ª and 2ª serve to receive the nipples 11—11 as before. The seats 5ª and 7ª are similar in construction and function to the shelves 5 and 7 of the first embodiment.

It will be apparent that this rim comprises but a very small number of parts, that those parts are simple in shape and susceptible of rapid and economical manufacture; that their shape is such as greatly to increase their natural rigidity and that the relative arrangement and association of parts is such as to give added strength to all of them. It will be obvious, however, that many of the advantages of my invention can be attained by means of constructions differing from those here disclosed, although the constructions here illustrated are those which my experience indicate as being the most practical.

While I have necessarily described my invention in detail I do not, therefore, propose to limit myself to such details except as the same may be positively included in the claims hereto annexed or may be rendered necessary by the prior state of the art.

Having thus described my invention, what I claim is:

1. In a rim for vehicle wheels, the combination with an annular member of sheet metal forming part of the wheel body; of a contractible transversely split band adapted to surround said member; a continuous detachable ring adapted to surround said band and formed to engage one side of a tire; means on said member preventing lateral movement of said ring in an outward direction; and a second ring removably secured directly to said annular member and adapted to engage the opposite side of a tire located thereon.

2. In a rim for vehicle wheels, the combination with an annular member of sheet metal forming part of the wheel body; of a contractible transversely split band adapted to surround said member and of a width less than that of said member; a continuous detachable ring adapted to surround said band and formed to engage one side of a tire; means on said member preventing lateral movement of said ring in an outward direction; and a second ring removably secured directly to said annular member and adapted to engage the opposite side of a tire thereon, said second ring fitting between the corresponding edge of said band and the adjacent edge of said member.

3. In a rim for vehicle wheels, the combination with an annular member of sheet metal forming part of the wheel body, said member being formed with a radially projecting flange on its one edge and with an encircling depression or groove along its other edge; of a contractible split band adapted to surround said member, said band being of a width less than that of said member and lying when in place against the flange thereon; a continuous detachable ring adapted to surround said band and formed to engage one side of a tire, the flange on said member preventing lateral movement of said ring in an outward direction; and a second ring removably secured in the groove on the other edge of said member, said second ring fitting between the corresponding edge of said band and the outer edge of such groove.

In testimony whereof, I hereunto affix my signature in the presence of two witnesses.

RICHARD S. BRYANT.

Witnesses:
HAROLD E. SMITH,
BRENNAN B. WEST.